March 15, 1932. E. OYEN 1,849,849
MACHINE FOR GRINDING CUTTERS
Filed Feb. 17, 1930 3 Sheets-Sheet 1
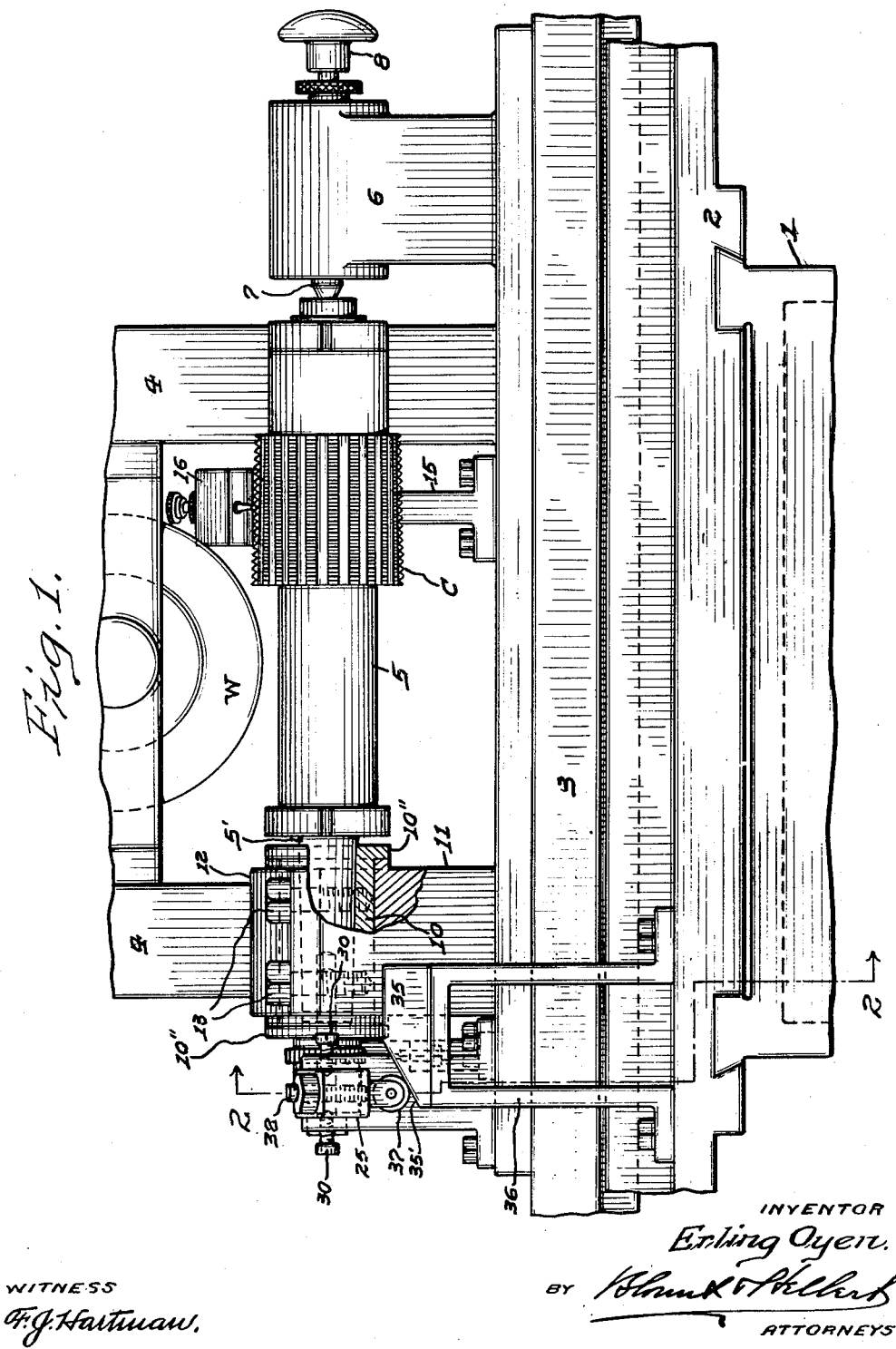
INVENTOR
Erling Oyen.

March 15, 1932.  E. OYEN  1,849,849
MACHINE FOR GRINDING CUTTERS
Filed Feb. 17, 1930   3 Sheets-Sheet 2
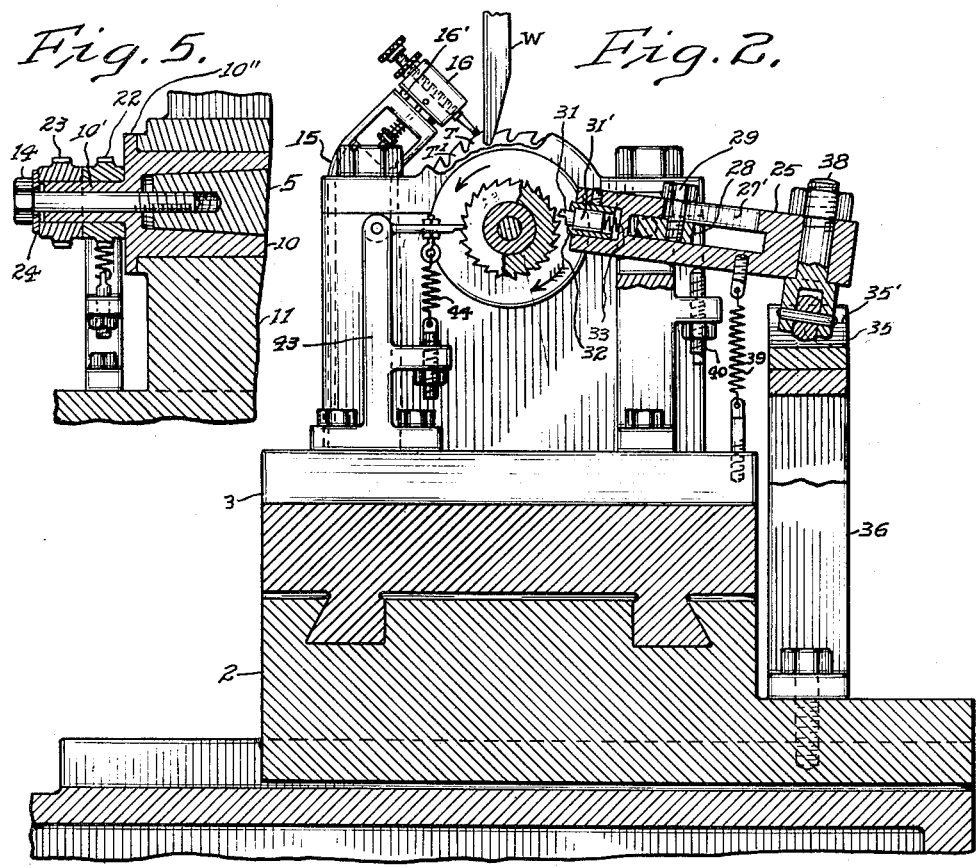
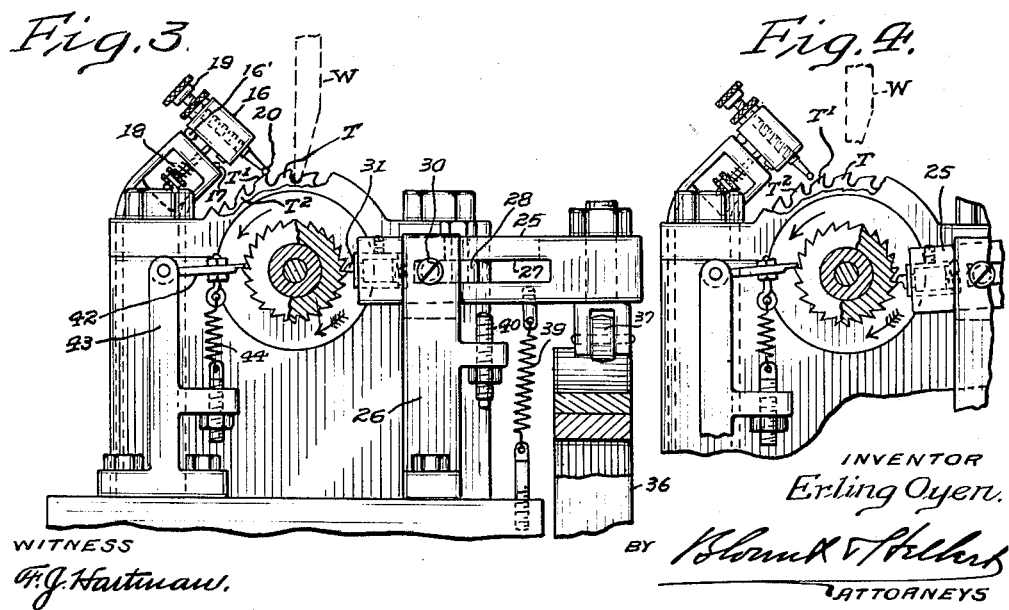
INVENTOR
Erling Oyen.
WITNESS
F. J. Hartman
BY
ATTORNEYS

March 15, 1932.     E. OYEN     1,849,849
MACHINE FOR GRINDING CUTTERS
Filed Feb. 17, 1930     3 Sheets-Sheet 3
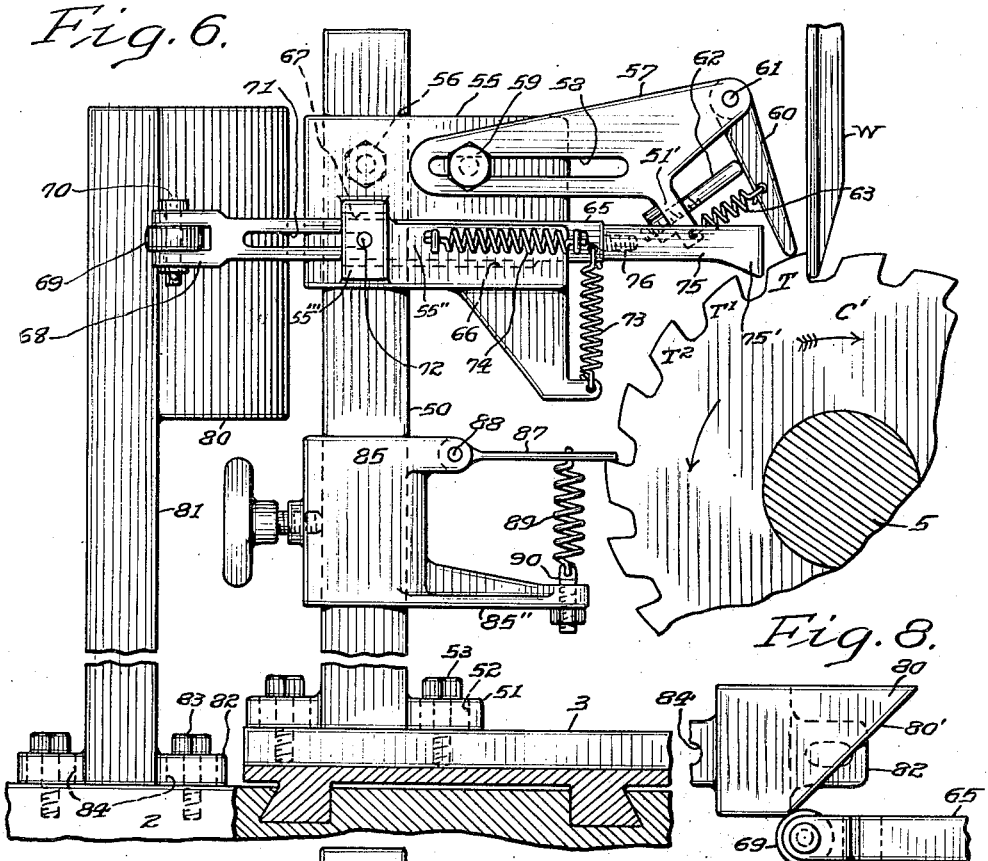
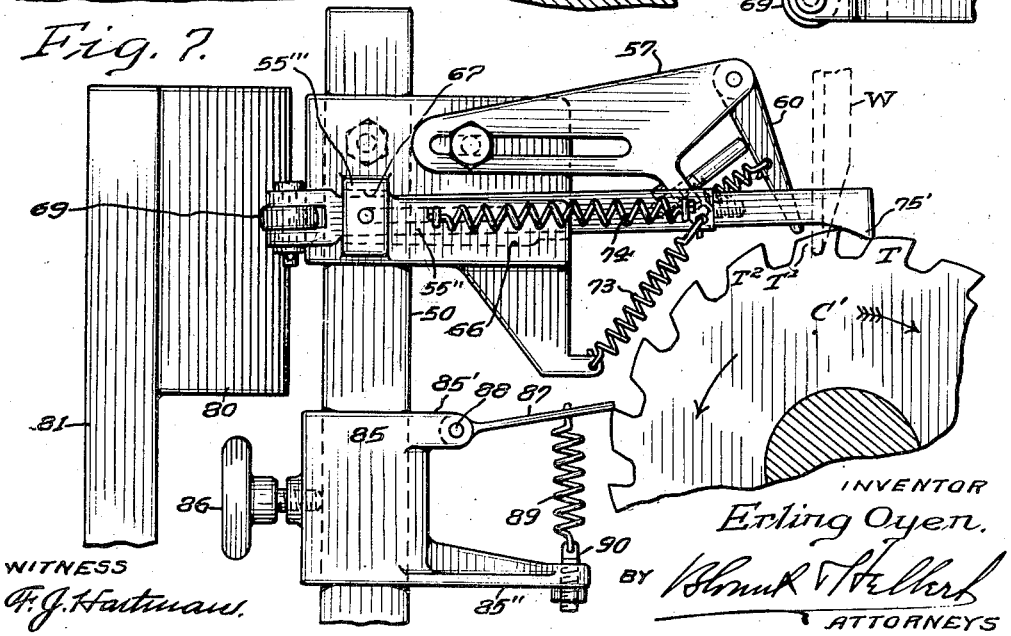
INVENTOR
Erling Oyen.
BY
ATTORNEYS
WITNESS Patented Mar. 15, 1932

1,849,849

UNITED STATES PATENT OFFICE

ERLING OYEN, OF YOUNGSTOWN, OHIO

MACHINE FOR GRINDING CUTTERS

Application filed February 17, 1930. Serial No. 428,954.

In grinding form milling cutters and the like it is customary after the cutter has been disposed on the arbor of the grinding machine to rotate the arbor sufficiently to bring the tooth which is to be ground a little past normal grinding position, and to then rotate the arbor in reverse direction so as to bring some portion of the tooth against a fixed stop disposed at a given distance from the face of the grinding wheel to thereby index the tooth in grinding position. The machine is then operated so as to carry the front face of the tooth past the grinding wheel to thereby grind the tooth, and this series of operations is then repeated for the next and each subsequent tooth until all of the teeth of the cutter are ground.

It has furthermore been the practice, at least until recently, to locate the stop or index finger in such position that it will arrest the reverse rotation of the cutter by engagement with the rear face of the tooth which is being indexed, but in an application for Letters Patent filed by George E. Mirfield on January 25, 1930, under Serial No. 423,320, there is disclosed and claimed a novel method of indexing milling cutters in position for grinding, as well as means adapted for the performance of the said method which, speaking generally, contemplates the indexing of the cutter teeth from their peripheries instead of from their back faces and which is effective in obtaining much more accurate results than were theretofore possible.

In the practice of the said method the cutter teeth are successively indexed preparatory to grinding by first rotating the cutter sufficiently to carry the tooth which is to be ground somewhat past normal grinding position and then reversing the direction of rotation of the cutter as above stated so as to bring that tooth into engagement with an indexing pointer located at a fixed distance from the face of the grinding wheel but so disposed as to engage the periphery of the tooth or a point on the side of the tooth adjacent thereto, as distinguished from the rear face of the tooth, to thereby index the latter in grinding position.

A principal object of the present invention, therefore, is to provide means for automatically imparting to the cutter, when rotatably supported in a suitable grinding machine, the forward and reverse rotations requisite for the consecutive indexing of each of its teeth in grinding position, so that the operator of the grinding machine is entirely relieved from the necessity of manually rotating the cutter first in one direction and then in the opposite direction preparatory to grinding each of the cutter teeth.

A further object of the invention is to provide mechanism of the character aforesaid which readily lends itself to operative combination and association with grinding machines of the types usually employed in the grinding of milling and like cutters and which thus may be added to or incorporated in such machines without the necessity of material reconstruction or rearrangement thereof.

A still further object of the invention is the provision of mechanism of the character aforesaid which may be conveniently adjusted in conformity with the number of annularly spaced teeth embodied in the cutter which is to be ground, thus enabling a grinding machine comprising the invention to be utilized for grinding cutters of various sizes and types and having different numbers of teeth.

Other objects, advantages and novel features of design, construction and arrangement comprehended by my invention are hereinafter more particularly mentioned or will be apparent to those skilled in the art from the following description of certain embodiments of the invention in operative association and combination with a grinding machine of a well known type and equipped with indexing mechanism of the general character of that to which reference has been made, all as illustrated in the accompanying drawings forming a part hereof.

In the said drawings, Fig. 1 is a front elevation of a grinding machine comprising one of said embodiments and having a milling cutter disposed therein in position for grinding, only so much of the grinding machine proper, however, being shown in this and the other figures of the drawings as is requisite for an adequate comprehension and understanding of the present invention. Fig. 2 is a transverse vertical section substantially on the line 2—2 of Fig. 1 looking in the direction of the arrows; Fig. 3 is a fragmentary end view, partially in vertical section, of certain of the parts shown in Fig. 2 but in a somewhat different position; Fig. 4 is another generally similar view showing the said parts in still another position, and Fig. 5 is a fragmentary central longitudinal section through the left hand end of the cutter arbor and adjacent parts when the machine is viewed as in Fig. 1. In Figs. 6 and 7, which are fragmentary end views generally corresponding as far as the position of the cutter is concerned to Figs. 2 and 4, but on a considerably larger scale, I have shown another embodiment of the invention together with as much of the grinding machine proper as is requisite for proper comprehension and understanding thereof, while Fig. 8 is a fragmentary top plan view of a portion of the mechanism shown in Fig. 6. The same characters of reference are used to designate corresponding parts in the several figures.

Referring now to that form of the invention shown in Figs. 1 to 5 inclusive, the grinding machine proper comprises the usual pedestal 1 supporting a table 2 transversely slidable thereon and in turn supporting a slide 3 longitudinally slidable with respect to the table, while from the rear of the pedestal behind the slide and table longitudinally spaced supports 4, 4 extend upwardly to afford support to a suitable grinding wheel W disposed between them. The machine is also provided with an arbor 5 upon which the cutter C is positioned while being ground, the arbor being of any preferred construction adapted to afford the requisite support to the cutter so that the latter will turn with the arbor. The slide of the machine also carries a tail stock 6 in which is disposed a center 7 on which the adjacent end of the arbor is rotatably supported, and means comprising a manually operable head 8 and other mechanism requiring no extended description are provided for moving the center 7 in and out so as to engage it with or withdraw it from the arbor.

At its opposite end the arbor is shown as provided with a conical portion 5' which extends into a correspondingly internally tapered sleeve 10 journaled in a pillow block 11 carried by the slide and provided with a removable bearing cap 12 held in position by bolts 13. At its outer or left hand end when viewed as in Fig. 1 the sleeve is provided with a cylindrical extension 10' desirably of less diameter than the main portion of the sleeve and through which is extended a bolt 14, the inner end of which is threaded into the adjacent end of the arbor in such manner that by tightening up on the bolt the arbor may be drawn into the sleeve and frictionally locked thereto so as to turn therewith, it being of course understood that the sleeve is provided on both sides of the pedestal and bearing cap with flanges 10" which operate to prevent its longitudinal movement. The several parts heretofore described, save the cylindrical extension 10' on the sleeve 10, are commonly found in one form or another in commercial grinding machines and thus require no further description.

The slide of the machine is also operative to support the pedestal 15 of the indexing mechanism, which preferably comprises a head 16 vertically movable on bearings 16' carried by the pedestal and normally held down against a stop 17 by yielding means generally designated as 18. This head is operative to support an indexing screw 19 desirably provided with a ball point 20 which is aligned with the path of the teeth which are to be indexed. In Figs. 2 and 4 the indexing head is shown in normal position and in Fig. 3 as slightly raised from the stop 17 through the engagement of one of the cutter teeth with the ball point 20 as hereinafter more fully explained.

Mounted on the end portion 10' of the sleeve 10 are a pair of ratchet wheels 22, 23, each preferably having the same number of ratchet teeth as the number of annularly spaced teeth in the cutter C; these wheels are disposed so that their teeth face in opposite directions and are removably held in position on the sleeve so as to turn therewith through the medium of the bolt 14 and a friction washer 24 disposed between its head and the adjacent wheel. This arrangement enables the wheels to be readily removed and replaced with others having a different number of teeth when required.

In the particular embodiment of the invention to which reference is being made, the wheel 22 in association with mechanism hereinafter described, is effective to bring about the requisite intermittent forward rotation of the cutter, that is, a clockwise rotation when the machine is viewed as in Figs. 2, 3 and 4, and which is indicated by the feathered arrows in the said figures, while the other wheel 23 in conjunction with other mechanism is operative to effect the reverse or counter-clockwise rotation of the cutter as indicated by the plain arrows.

For imparting motion to the wheel 22, a lever 25 is pivotally supported in a forked standard 26 mounted on the slide 3, and to facilitate adjustment of the lever toward or away from the wheel I prefer to provide the lever with a slot 27 for the reception of a block 28 slidable longitudinally of the slot and adapted to be secured in any position of adjustment therein by a bolt 29 extending through a smaller slot 27' communicating with the slot 27. The block is provided with suitable aligned depressions in its opposite faces for receiving the inner ends of pivot screws 30 extending through the jaws of the standard 26 and forming an axis about which the block, and in turn the lever in which it is disposed, may be oscillated in a vertical plane. Thus, by loosening the bolt 29 the lever may be slid in or out relatively to the block so as to bring a dog 31 at the inner end of the lever into proper relation with the wheel 22, but, if preferred, other means for effecting this adjustment may be provided.

The dog 31 is arranged in any convenient way for cooperation with the wheel and in such manner that when the inner end of the lever, that is, the end at which the dog is disposed, is depressed, the dog, by engagement with the teeth of the wheel, will rotate the latter in a clockwise direction, but when the said end of the lever is raised from a depressed position the dog will ride over the teeth of the wheel without effecting any rotation thereof. Thus, as shown, the dog 31 may be formed on the end of a shank 31' housed in a sleeve 32 having an overhanging flange at its outer end cooperative with a shoulder at the corresponding end of the shank to limit outward movement thereof; this sleeve is seated in a bore in the end of the lever, a spring 33 behind the shank and bearing on the bottom of the bore being provided for yieldingly pushing the dog outwardly to the limit of its movement in the sleeve, the outer end of the dog itself being of course suitably formed for coaction with the ratchet teeth on the wheel 22.

Means are provided for effecting oscillation of the lever at the proper times in the cycle of operations of the machine, said means desirably comprising a cam 35 mounted on a bracket 36 on the table 2 and having an inclined face 35' adapted for cooperation with a roll 37 disposed in the fork of a clevis pin 38 secured in the outer end of the lever. A tension spring 39 is disposed between the lever and the slide 3 in such position that it will tend to draw the outer end of the lever downwardly so as to cause the roll to follow the inclined face of the cam when engaged therewith and also, when the roll is out of engagement with the cam, maintain the lever with its inner end in raised position as shown in Fig. 3, an adjustable stop screw 40 carried by the bracket 26 serving to limit the distance through which the outer end of the lever can be drawn down by the spring.

Means are also provided for effecting the requisite counter-clockwise rotation of the cutter through the medium of the ratchet wheel 23, said means desirably comprising a finger 42 pivoted at one end on a bracket 43 carried by the slide and engaging the teeth of the ratchet wheel 23 at its other end, while a spring 44 is arranged to continuously draw the finger downwardly and provision for varying the tension of the spring provided through an adjustable bolt to which one end of the spring is attached and which extends through a lug on the bracket.

Reference will now be made to the operation of the machine when constructed and assembled substantially as hereinbefore described: The cutter C whose teeth are to be ground, and which may comprise either a single row of annularly spaced teeth T, T¹, T², etc., or a plurality of such rows arranged side-by-side as shown in Fig. 1, is first assembled on the arbor 5 and the latter then inserted in the sleeve 10, ratchet wheels 22 and 23 having a number of teeth corresponding to the number of teeth on the cutter being assembled at the same time on the extension 10' of the sleeve, so that after the bolt 14 is set up the ratchet wheels will be constrained to turn with the sleeve. Meanwhile, the center 7 is brought up to the other end of the arbor in the usual way and properly adjusted so as to eliminate any longitudinal motion of the arbor. The index screw 19 is then adjusted with the head 16 in normal or lowered position so that the ball point 20 will contact with one of the teeth T either at a point exactly on its peripheral cutting edge or a point on the side face of the tooth adjacent thereto when the tooth is turned to a position with respect to the grinding wheel W such that the requisite amount of metal to properly sharpen the same will be removed by the wheel from the front face of the tooth when the latter is moved across the wheel. During these several operations the slide 3 is of course so positioned that the cutter is entirely out of engagement with the grinding wheel, for example, approximately, as shown in Fig. 1, and when the several adjustments are completed, the lever 25, dog 31, finger 42 and adjacent parts occupy approximately the positions shown in Fig. 2. The machine is now in condition for grinding the front faces of the tooth, or longitudinal row of teeth, T, which operation is performed in the usual way by moving the slide 3 to the left when viewed as in Fig. 1 so as to carry the cutter past the wheel, the cutter arbor and cutter during this operation being restrained from counter-clockwise rotation by the ball point 20.

In order to properly grind the entire row of teeth T the movement of the slide to the left is continued until the cutter is entirely clear of the wheel, and as soon as this condition is attained the direction of movement of the slide is reversed and the cutter returned past the wheel to its initial position. As the slide approaches the end of this reverse movement, however, the roll 37 engages and thereafter rides up on the inclined face 35' of the cam 35, thus progressively raising the outer end of the lever 25 and causing the dog 31 at the inner end thereof to rotate the ratchet wheel 22 with corresponding rotation of the cutter arbor and cutter which is now entirely clear of the grinding wheel. The clockwise or forward rotation of the cutter so induced first clears the tooth T from the ball point 20 of the index screw and then moves the succeeding tooth $T^1$ into engagement therewith, but as the point 20 when in normal position lies within the arc described by the point of the tooth adjacent its front face, further movement of the tooth lifts the index screw and head from their normal position sufficiently to permit the ball to ride over the point of the tooth substantially as indicated in Fig. 3. However, as the periphery of the tooth falls away rapidly toward its rear face and as the index head 16 is continually yieldingly drawn toward its normal position, the ball point during the still further rotation of the cutter rides down along the periphery of the tooth until the head, which is gradually descending, reaches normal position as the tooth finally passes out of engagement with the point 20, after which any additional movement of the tooth merely progressively widens the distance between it and the point, so that at the conclusion of the turning movement induced by the lever 25 and cam 35 and which of course is terminated when the slide is brought to rest, the parts occupy substantially the positions shown in Fig. 4 with the ball point of the index screw out of contact with the adjacent tooth $T^1$.

During the forward turning movement to which reference has just been made, the finger 42 through its engagement with one of the teeth of the wheel 23 has been gradually swung upwardly about its pivot in opposition to the pull exerted by the spring 44, but as soon as the direction of movement of the slide is again changed so as to move the slide toward the left, the finger, under the influence of its spring, rotates the ratchet wheel 23 and in turn the cutter arbor and cutter in reverse or counter-clockwise direction as the roll 37 moves down along the inclined cam 35 under the influence of spring 39, the dog 31 meanwhile riding over the teeth of the ratchet wheel 22 as the inner end of the lever 25 rises until its initial position as shown in Fig. 2 is finally attained. The counter-clockwise rotation thus communicated to the cutter is effective to move the tooth $T^1$ back toward the indexing mechanism until the ball point 20 thereof by engagement with the tooth $T^1$ arrests further turning movement and thus indexes that tooth, or row of teeth of which that tooth is a part, in proper relation to the grinding wheel W. These operations, which serve to properly index the tooth $T^1$ in grinding position and thus complete the cycle, are concluded before the left hand end of the cutter engages the wheel, and the tooth or teeth $T^1$ may then be ground by a further movement of the slide to the left sufficient to carry the cutter across the face of the wheel. The succeeding teeth $T^2$, etc. of the cutter are then consecutively indexed and ground in the same manner.

It will thus be apparent that after each tooth or row of teeth is ground, the cutter is rotated forwardly through an arc sufficient to bring the succeeding tooth or row of teeth somewhat in advance of normal grinding position and is then rotated rearwardly or in reverse direction through an arc sufficient to effect the proper engagement of a tooth in that row with the indexing mechanism to thereby index that tooth or row of teeth in proper relation to the grinding wheel, and that these several operations are performed entirely automatically and without any attention on the part of the operator of the machine. As hitherto stated, the number of teeth on the ratchet wheels should correspond to the number of annularly spaced teeth on the cutter for most satisfactory operation, and consequently a plurality of interchangeable ratchet wheels are desirably provided in conformity with various types of cutters which it is intended to grind in the machine. Moreover, the length of the arc through which the cutter will be rotated at each actuation of the lever 25 and the relation of the dog 31 to the particular ratchet wheel being employed may be adjusted to a nicety when and as required by moving the lever longitudinally with respect to its pivots.

In Figs. 6 and 7 I have shown another embodiment of the invention which may desirably be employed under certain conditions for indexing cutters having teeth of various forms and particularly those in which the teeth are of relatively large size with correspondingly relatively large spaces between them, such, for example, as many types of form cutters used for milling and other operations. In this form of the invention the requisite intermittent forward and reverse rotation of the cutter may be imparted directly to the cutter itself through the operation of suitable mechanism instead of to the arbor on which the cutter is supported, the principles of operation, however, being identical with those incident to the form of the invention heretofore described.

The grinding machine proper may comprise, as hitherto explained, a table 2 and slide 3 movable longitudinally of the table as well as an arbor 5 suitably rotatably supported on the slide, the cutter C' which is to be ground being mounted on the arbor so that it can be carried across the face of the grinding wheel W to grind the front faces of the cutter teeth T, $T^1$, $T^2$, etc. after they are respectively indexed in proper grinding position.

Also mounted upon the slide is a post 50 having a base 51 preferably provided with transversely disposed slots 52 for the passage of bolts 53, the slots 52 thus affording capacity for limited adjustment of the post to and from the cutter arbor to permit the post and the mechanism which it serves to support to be properly disposed for operation with cutters of different diameters. Slidably mounted on the upper end of the post, which may be of any preferred cross sectional contour, is a head 55 which may be secured in any desired position of vertical adjustment by a set screw 56 or other suitable means. This head serves to support both the indexing mechanism proper, desirably through the medium of a bracket 57, and also the mechanism which serves to directly impart to the cutter the requisite clockwise or forward rotation in the direction indicated by the feathered arrows; to facilitate adjustment of the bracket it is preferably provided with a slot 58 for the passage of a bolt 59 which serves to secure the bracket to the head, so that by loosening the bolt the bracket can be slid toward or away from the plane of the wheel W to thereby properly position the indexing mechanism with respect to the cutter.

The indexing mechanism may be of any preferred construction suitable for effecting its intended function and thus, as hitherto described, may comprise a vertically movable head having an indexing screw provided with a ball point or, as shown in Figs. 6 and 7, may comprise a finger 60 pivoted at its upper end to the bracket on a pivot 61 for vertical oscillation and extending generally downwardly and forwardly, the lower or free end of the finger being rounded or provided with a ball point or otherwise suitably formed for engagement with the peripheries of the cutter teeth or with points on the sides of the teeth adjacent their peripheries. For limiting the rearward movement of the finger an adjustable stop screw 62 is mounted in a lug 51' integral with the bracket and a spring 63 is interposed between the lug and the finger in such manner as to constantly draw the latter toward the stop screw and normally yieldingly maintain it in engagement therewith. It will of course be understood that when the cutter is assembled on the arbor one of its peripheral rows of teeth is brought into proper alignment with the finger so that when the cutter is turned back in counterclockwise direction the finger, by engagement with the periphery of a tooth in such row or with a point on a side thereof adjacent its periphery, will serve to consecutively index that tooth, or longitudinal row of teeth of which it forms a part, in grinding position in a manner generally similar to that in which the head, indexing screw and other parts of the indexing mechanism heretofore described operate under like conditions.

The head 55 is also operative to support a normally horizontally disposed slide 65 adapted for longitudinal reciprocation toward and away from the plane of the grinding wheel and also capable of limited vertical movement from its normally horizontal position as and when required. The particular means employed for mounting the slide on the head in such manner that it is capable of performing the movements to which reference has just been made are a matter of choice, but a convenient method of so doing is to form the body of the slide of rectangular cross section and to provide the head with an offset lip 55' on one side so as to form a horizontally extending groove between the inner face of the lip and the face of the head for the reception of the slide. The head may also be provided at the rear end of the lip 55' with a boss 55'' into which the lip suitably merges and through which is extended an opening for the passage of the slide, and to decrease friction between the parts when the slide reciprocates, the bottom of the groove save at its forward end may be cut away as at 66 so as to form a clearance between the bottom of the slide and the bottom of the groove for the major portion of the length of the latter, this clearance being carried through the boss and a similar clearance 67 formed above the slide where it passes therethrough to permit the requisite vertical movement of the slide to which reference has been made.

The rear end of the slide is formed into a clevis 68 for the reception of a roll 69 rotatable on a vertical axis formed by the clevis pin 70, and the slide is also provided with a slot 71 extending forwardly from the clevis for a distance approximating the maximum required reciprocation of the slide, while a pin 72 is extended through the boss 55''' and the slot; this pin by engagement with the ends of the slot is effective to limit its movement in either direction and also forms a pivot about which the forward end of the slide can be swung up from its normally horizontal position, a spring 73 connected between the slide and a lug on the head serving to normally yieldingly hold the slide down in the groove formed by the lip 55'' and to return it thereto when it has been lifted therefrom. Another spring 74, connected between a point on the outside of the lip and a point on the slide adjacent its forward end, is operative to continuously draw the slide rearwardly and thus normally maintain it at the limit of its movement in that direction as determined by engagement of the pin 72 with the forward end of the slot 71 or such other limiting means as may be preferred.

At its forward end the slide is provided with a preferably removable head 75 operatively secured on the slide in any convenient way as through the medium of a forwardly projecting threaded stud 76 carried by the slide cooperative with an internally threaded bore in the rear end of the head, the extremity of the head being of shape suitable for cooperation with the rear faces of the cutter teeth and thus ordinarily having a depending toe 75' adapted to enter between them and to press on their rear faces so as to effect the requisite clockwise rotation of the cutter when the slide is projected forwardly. As the precise conformation of the head is largely dictated by the shape and size of the teeth of the cutter, it is sometimes necessary for most satisfactory operation to employ different shapes of heads when grinding cutters of different forms, and as the head is easily removable from the slide this substitution can be very easily effected whenever required.

Suitable means are also provided for reciprocating the slide 65 when the slide 3 of the grinding machine is actuated to move the cutter away from the grinding wheel after a given tooth has been ground and preparatory to indexing the succeeding tooth, said means desirably comprising a cam 80 having an inclined face 80' for engagement by the roll 69. This cam is either operatively secured to or formed integral with a vertically extending pedestal 81 having a base 82 seated on and suitably secured to the table 2 of the machine as by bolts 83 extending through slots 84 in the base so as to afford limited capacity for adjustment of the cam transversely of the slide 3. The cam is of sufficient length vertically to align with the roll 69 whatever be the adjusted height of the head 55 on the post 50, and the pedestal 81 is so located on the table of the machine that after the slide 3 has been moved to the right, when viewed as in Fig. 1, for a distance at least sufficient to clear the cutter from the wheel W, the roll will be brought into engagement with the cam near the rear edge of its inclined face, as shown in Fig. 8, so that further movement of the slide 3 will carry the roll over said face and thus force the slide 65 forward to bring the toe 75' into engagement with the rear face of the tooth T which has just been ground and thus, as the movement of the slide 3 continues, turn the cutter through an arc sufficient to move the tooth $T^1$ somewhat past normal grinding position, the position of the parts at the conclusion of this movement being approximately as indicated in Fig. 7. As the tooth $T^1$ during this movement passes beneath the index finger 60, the latter is swung up from normal position until it clears the point of the tooth and thereafter rides down the periphery thereof until it passes out of engagement therewith just before the forward turning movement of the cutter is completed, just as the ball point on the end of the index screw in the form of the invention previously described first rides up over and finally passes out of engagement with the tooth $T^1$ under like conditions; the index finger is thus brought to a position to properly engage and index the tooth $T^1$ on the ensuing counterclockwise movement of the cutter. Moreover, as the tooth $T^1$ moves from initial to final position during its forward or clockwise movement, it ordinarily engages the head of the slide somewhat behind the extremity of the toe 75' and thus swings the slide upwardly through a limited arc about the pivot formed by the pin 72 and against the pull of the spring 73.

The cutter is now in condition for the ensuing counterclockwise rotation requisite to bring the periphery of the tooth $T^1$, or some point on a side of the tooth adjacent its periphery, into engagement with the finger 60 to thereby index the tooth in grinding position, and for effecting this movement suitable means are provided which may preferably be generally similar to the means employed for effecting a like function in the form of the invention shown in Figs. 1 to 5 inclusive. Thus, the said means may comprise a collar 85 disposed on the post 50 beneath the head 55 and arranged to be secured in any desired position of vertical adjustment thereon by a set screw 86. To a lug 85' at the upper end of this collar a finger 87 is pivoted on a horizontal pivot 88 and a spring 89 is connected between the finger and a spring tension adjusting screw 90 disposed in an arm 85'' extending from the lower portion of the collar in such manner as to continuously draw the finger downward, the free end of the finger 87 being adapted to coact with one of the teeth of the cutter, similarly to the finger 42 in the form of the invention previously described, to effect counterclockwise rotation of the cutter.

It will of course be understood that the slide 65 and head 75 are so disposed as to lie in a plane adjacent but not coincident with that of the index finger 60 and that these parts can thus either be so arranged as to both operate on a single peripheral row of teeth on the cutter or respectively upon adjacent rows, the latter arrangement being frequently more convenient as it facilitates the provision of proper clearance between the index finger and the head of the slide.

Thus, following the grinding of an initially manually indexed tooth T by moving the slide 3 first to the left when viewed as in Fig. 1 so as to carry that tooth or the longitudinal row of teeth of which it may form a part across the face of the wheel W and then moving it in reverse direction so as to clear the cutter from the wheel, the cutter is rotated in a clockwise direction toward the end of this reverse movement through co-action of the cam 80 and slide 65 sufficiently to move the succeeding tooth $T^1$ substantially to the position shown in Fig. 7, in which the index finger 60 is clear of the periphery of the tooth and the finger 87 has been lifted upwardly against the tension of the spring 89 by one of the teeth of the cutter lying adjacent thereto, the cutter, however, being prevented from counterclockwise rotation by the slide 65 which is still in forwardly projected position with its roll 69 bearing on the cam. The slide 3 of the grinding machine is now again moved to the left, thus permitting gradual retraction of the slide 65 by the spring 74 as the roll 69 is moved toward the rear edge of the inclined face 80' of the cam, thus relieving the pressure of the head 75 on the tooth T with resulting rotation of the cutter in reverse or counterclockwise direction under the influence of the finger 87 and spring 89. This reverse rotation ultimately brings the periphery of the tooth $T^1$, or a point on a side thereof adjacent its periphery, into engagement with the index finger 60 which is now resting on its stop screw 62, thereby indexing tooth $T^1$, or the longitudinal row of teeth of which it forms a part, in grinding position just before the leading tooth in that row passes into contact with the wheel W as the movement of the slide 3 toward the left continues. The teeth or row of teeth $T^1$ are thereupon ground by further movement of the slide to the left and the succeeding teeth $T^2$, etc., then successively indexed and ground in like manner.

It may be noted in passing that among the advantages arising from the use of my invention with consequent automatic instead of the customary manual indexing of the teeth is the fact that as the cutter is always rotated in reverse direction with the same force which, of course, is that exerted by the springs controlling the fingers 42 or 87, each tooth is brought against the indexing point with the same pressure, with consequent increase in the accuracy of the indexing of the several teeth over that which is frequently obtained under commercial operating conditions when the requisite reverse rotation of the cutter is manually imparted thereto by the operator. Furthermore, by the use of my invention a material saving in time is effected over that required for the customary manual indexing and the operator of the grinding machine is entirely relieved from the nervous strain inherently incident thereto, while as the mechanism employed is of relatively simple form although entirely positive and certain in action, it is not liable to get out of order and requires but a minimum amount of care and attention to keep it in satisfactorily operative condition.

While I have herein referred more particularly to the use of my invention in connection with indexing mechanism adapted to index the cutter teeth either from their peripheral cutting edges or from points on the side faces of the teeth adjacent thereto as distinguished from the rear faces of the teeth, I do not thereby desire or intend to restrict the use of my invention solely to grinding machines having indexing mechanism designed to operate in this manner since, if desired, my invention may be employed in grinding machines having indexing mechanism adapted to index from the rear faces of the teeth or, in fact, in any other preferred manner, as will be readily understood by those familiar with the art. Moreover, while I have herein illustrated and described certain embodiments of my invention, it is not my intention to restrict or limit myself specifically thereto or to any precise details in the design, construction and arrangement of the several parts thereof or to the use of the invention with any particular kind or form of grinding machine.

Having thus described my invention, I claim and desire to protect by Letters Patent of the United States:

1. The combination with a cutter grinding machine having a grinding wheel, a rotatable arbor adapted to support the cutter which is to be ground, a slide for moving the cutter relatively to the wheel so as to grind the cutter teeth and indexing means adapted to consecutively index the cutter teeth in grinding position, of a cam, and means carried by the slide cooperative with said cam when the slide is moved in a predetermined direction to rotate the cutter in one direction sufficiently to move a tooth out of grinding position after it has been ground and the succeeding tooth through said position and for a predetermined distance therebeyond, and other means for then rotating the cutter in the opposite direction to move said tooth into engagement with the indexing means to thereby index said tooth in grinding position.

2. The combination with a cutter grinding machine having a grinding wheel, a slide relatively movable with respect thereto, an arbor rotatably mounted on the slide and adapted to support the cutter which is to be ground, and indexing mechanism carried by the slide, of a cam, and means carried by the slide cooperative with said cam when the slide is moved in a predetermined direction to rotate the cutter in one direction through a limited arc sufficient to move a tooth which has been ground out of grinding position and the succeeding tooth through said position, and other means also carried by the slide operative to then rotate the cutter in the opposite direction to bring the last mentioned tooth into engagement with the indexing means to thereby index said tooth in grinding position.

3. The combination with a cutter grinding machine having a grinding wheel, a reciprocable slide and an arbor rotatably mounted on the slide and adapted to support a cutter which is to be ground, of means operative to rotate the arbor through a limited arc during movement of the slide in one direction and comprising a ratchet wheel, a lever carried by the slide and a cam relatively stationary with respect to the slide, and other means also carried by the slide operative to then rotate the arbor in reverse direction while the slide is being moved in the opposite direction.

4. The combination with a cutter grinding machine having a grinding wheel, a movable slide and an arbor rotatably mounted on the slide and adapted to support a cutter which is to be ground, of means for rotating the arbor through a limited arc while the slide is being moved in a predetermined direction and comprising a ratchet wheel carried by the arbor, a lever pivoted on the slide and a cam relatively fixed with respect to the slide and cooperative with the lever, other means means for rotating the arbor in reverse direction during an ensuing opposite movement of the slide comprising a second ratchet wheel carried by the arbor and spring controlled means cooperative therewith and means engageable with a tooth of the cutter operative to stop said reverse rotation when said tooth has reached grinding position.

5. The combination with a cutter grinding machine having a grinding wheel, a movable slide and an arbor rotatably mounted on the slide and adapted to support a cutter which is to be ground, of a pair of ratchet wheels carried by the arbor and having their teeth disposed in opposite directions, a lever having a yielding dog cooperative with one ratchet wheel to rotate the latter and in turn the arbor in one direction when the lever is moved and means for actuating the lever when the slide is moved in a predetermined direction, and yielding means cooperative with the other ratchet wheel tending to rotate the arbor in reverse direction to that in which it is rotated through the actuation of said lever.

6. In a cutter grinding machine having a rotatable arbor, means for intermittently rotating the arbor through a limited arc in a predetermined direction and then in the opposite direction comprising a pair of ratchet wheels carried by the arbor, a pivoted lever carrying a movable dog cooperative with one of said wheels and positively actuated means operable to move the lever so as to rotate the arbor in the first mentioned direction, and a spring controlled finger cooperative with the other wheel and operative to rotate the arbor in the opposite direction following completion of the first mentioned rotation.

7. In a grinding machine having a rotatable arbor adapted to support a cutter and cutter indexing means, means for rotating the arbor so as to move the cutter when supported on the arbor relatively to the indexing means through a limited arc in a predetermined direction and comprising a ratchet wheel carried by the arbor, a pivoted lever carrying a dog cooperative with the wheel and means for actuating the lever, and means for rotating the arbor in the opposite direction to effect engagement of a cutter tooth with the indexing means subsequent to said first mentioned rotation comprising another ratchet wheel carried by the arbor and a spring controlled finger cooperative therewith.

8. The combination with a cutter grinding machine having a grinding wheel, a movable slide and an arbor rotatably mounted on the slide and adapted to support a cutter which is to be ground, of a cam carried by the grinding machine, a spring controlled slide carried by the first mentioned slide operative when engaged by said cam to rotate the cutter in one direction and a spring actuated finger also carried by the slide operative to rotate the cutter through a limited arc in the opposite direction after termination of said first mentioned rotation.

9. The combination with a cutter grinding machine having a grinding wheel, a movable slide and an arbor rotatably mounted on the slide and adapted to support a cutter which is to be ground, of a spring controlled slide carried by said first mentioned slide operable to engage a tooth of the cutter, means for actuating said spring controlled slide to thereby rotate the cutter through a limited arc in one direction and means for thereafter rotating the cutter through a more limited arc in the opposite direction.

In witness whereof, I have hereunto set my hand this 6th day of February, 1930.

ERLING OYEN.